United States Patent [19]
Reinhardt et al.

[11] Patent Number: 5,281,106
[45] Date of Patent: Jan. 25, 1994

[54] RADIAL-BLADE DOUBLE-INLET FAN

[75] Inventors: Wilhelm Reinhardt, Schrozberg-Gutbach; Markus Neckermann, Bad Mergentheim, both of Fed. Rep. of Germany

[73] Assignee: ebm Elektrobau Mulfingen GmbH & Co., Fed. Rep. of Germany

[21] Appl. No.: 906,934

[22] Filed: Jun. 30, 1992

[30] Foreign Application Priority Data

Jul. 3, 1991 [DE] Fed. Rep. of Germany ....... 4121927

[51] Int. Cl.$^5$ .............................................. F04B 17/00
[52] U.S. Cl. ................................... 417/354; 417/363; 417/423.8; 415/119
[58] Field of Search ............... 415/119; 417/354, 363, 417/366, 423, 350, 368, 372, 423.14, 423.7

[56] References Cited

U.S. PATENT DOCUMENTS

| 2,661,894 | 12/1953 | Stevenson et al. | 417/363 |
| 2,776,088 | 1/1957 | Wentling | 417/354 |
| 2,830,752 | 4/1958 | Wentling | 417/354 |
| 2,923,460 | 2/1960 | Galaba | 417/354 |
| 2,936,947 | 5/1960 | Staak | 417/363 |
| 3,175,755 | 3/1965 | Rockafield | 417/354 |
| 5,030,068 | 7/1991 | Jacobs et al. | 417/363 |

FOREIGN PATENT DOCUMENTS

| 1021974 | 1/1958 | Fed. Rep. of Germany . |
| 1175785 | 10/1962 | Fed. Rep. of Germany . |
| 8100414 | 1/1981 | France . |
| 363119 | 10/1960 | Sweden . |

*Primary Examiner*—Richard A. Bertsch
*Assistant Examiner*—Alfred Besichas
*Attorney, Agent, or Firm*—Jones & Askew

[57] ABSTRACT

A radial-blade double-inlet fan (1) which includes a casing (2) with two inlet openings (8,10) facing each other, an external electrical rotor motor (14) located in casing (2), having a stator (16) and a rotor (18), and of a radial impeller (20) which is connected to rotor (18) and which axially extends on both sides beyond motor (14) into the direction of inlet openings (8,10). To absorb the oscillations, motor (14) is flexibly supported by the casing. Stator (16) is connected to stator flange (32), and rotor (18) encloses stator (16) only along one side approximately up to stator flange (32). To support motor (14), shaft (34) pivots in a pivot bearing which is attached to casing (2) by means of a flexible oscillation-absorbing element (36), with this shaft rotating with rotor (18) and extending axially beyond motor (14), on the one hand, and stator flange (32) is connected by means of a heat-conducting metal lamination directly to a flange-extending element (40) which functions as a cooling element and which is located in the flow path of a medium to be transported, with this stator flange being attached to casing (2) in such a way that the attachment is both flexible and torsion-resistant, on the other hand.

13 Claims, 3 Drawing Sheets

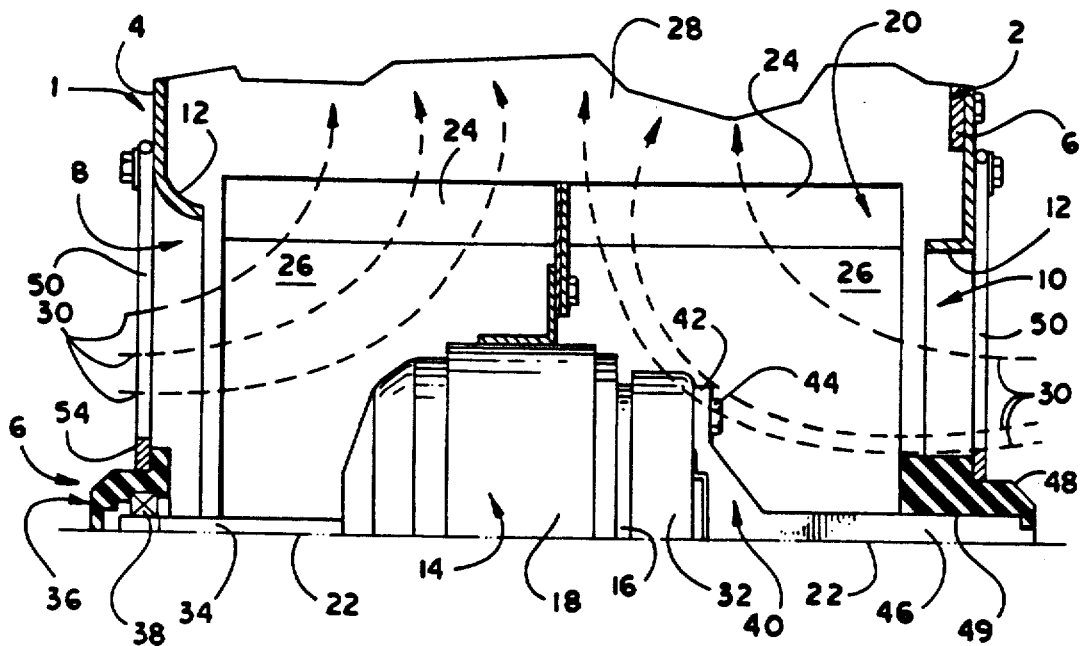
Fig_1
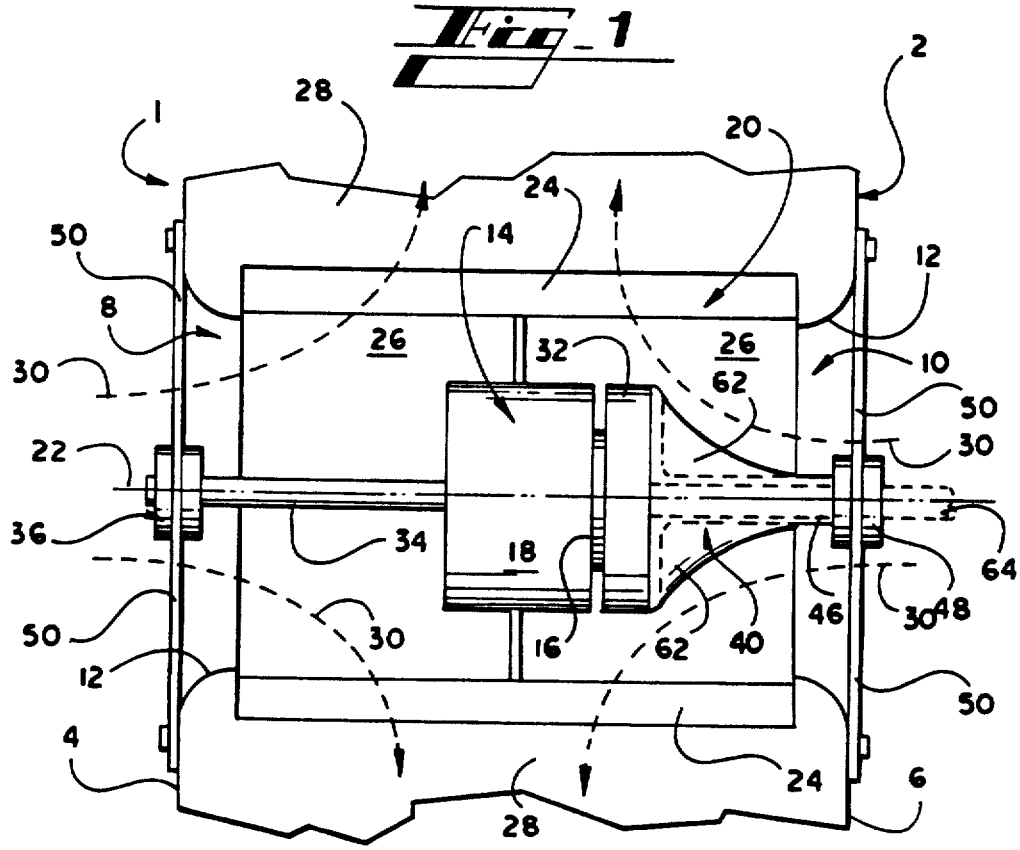
Fig_2

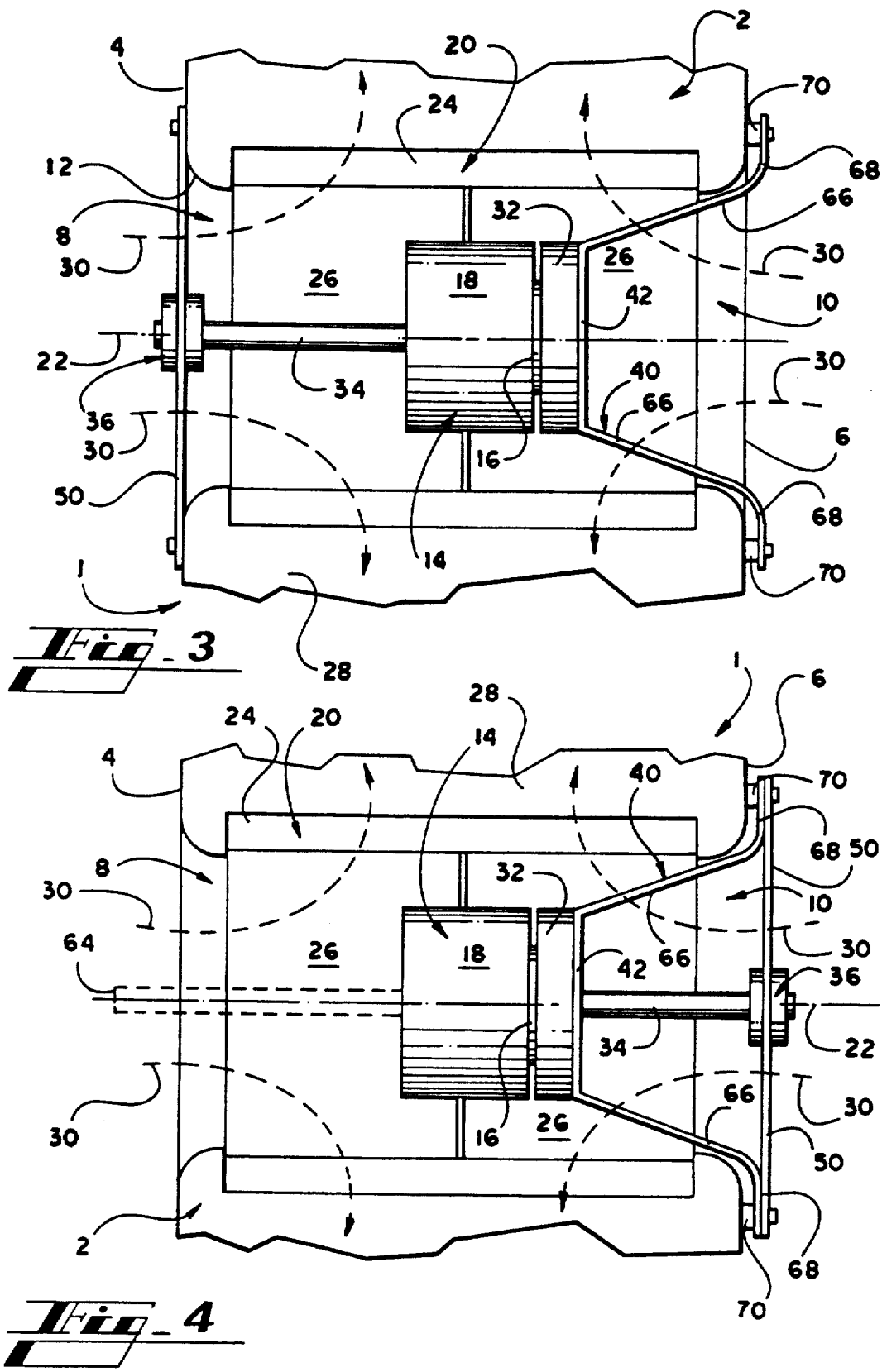

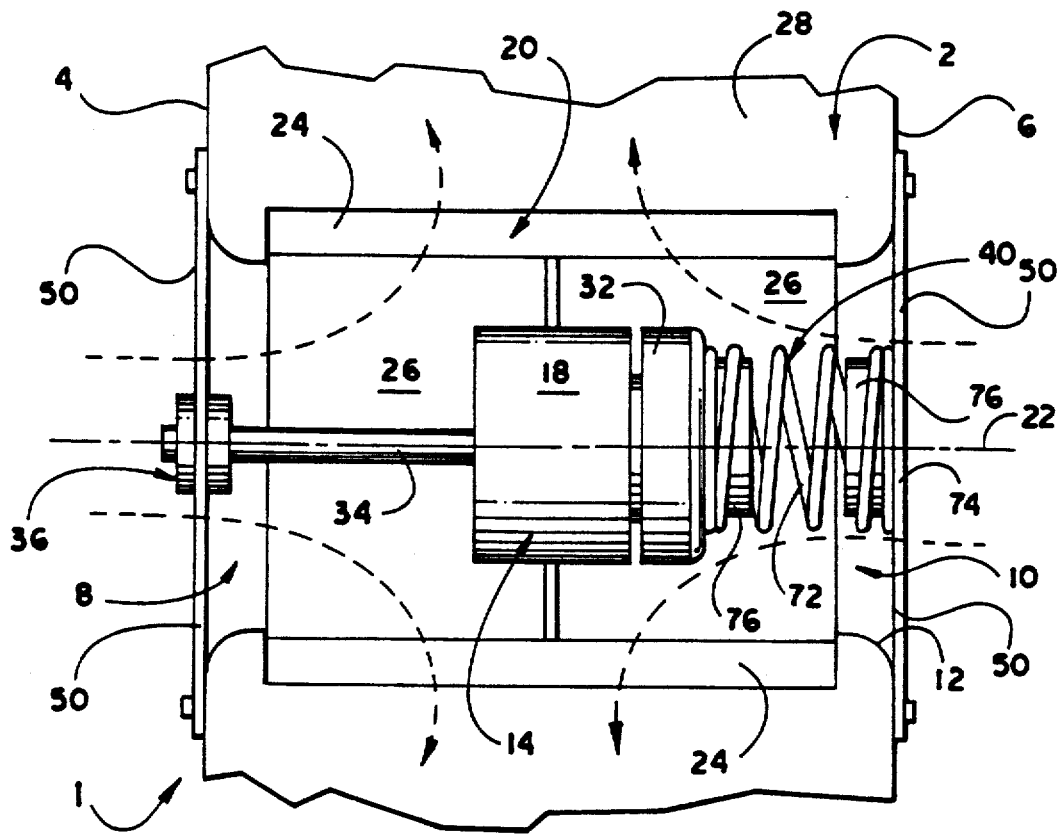
Fig_5
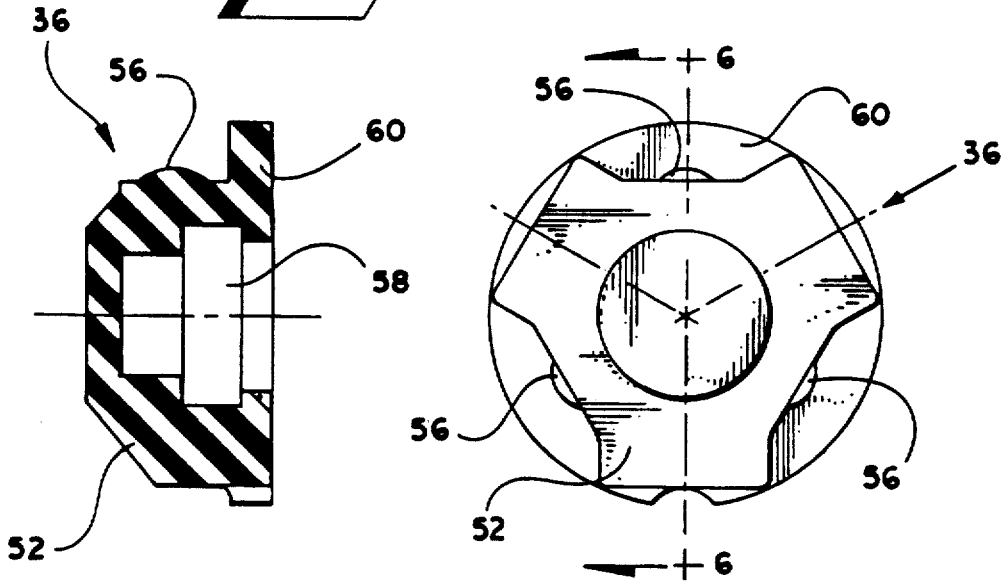
Fig_6   Fig_7

RADIAL-BLADE DOUBLE-INLET FAN

The subject matter of this invention concerns a radial-blade double-inlet fan which consists of a casing with two inlet openings facing each other, an external electrical rotor motor in the casing which is centered between the inlet openings and which has a stator and a rotor, and a radial impeller which is connected to the rotor so as to allow rotation around a rotational axis, with this axis running through the inlet openings, and which axially extends on both sides beyond the motor into the direction of the inlet openings. The motor is flexibly supported by the casing.

In this type of fan in which a medium to be transported, such as especially air, is axially drawn in through the inlet openings on both sides and is subsequently radially accelerated and blown out by the impeller, oscillations generally occur due to electrical and/or mechanical asymmetries in the vicinity of the motor and/or due to mechanical balance errors of the motor and/or of the impeller. Furthermore, it is often necessary to control the number of rotations of the fan by means of a phase control of the motor. This causes additional oscillations to be generated as a result of high-frequency harmonic oscillations. If the oscillations are transmitted to the casing an unpleasant grating noise will develop, especially in those cases in which the oscillation frequency is within the range of the resonance frequency of the casing. It is therefore necessary to "uncouple" the motor from the casing, i.e., to suspend it flexibly from the casing, in order to ensure that the oscillations are absorbed.

A fan of this type is well-known from the U.S. Pat. No. 2,830,752. In this patent, the motor is supported by means of a hollow axle rigidly connected to the stator, i.e., a nonrotating hollow axle, which extends on both sides beyond the rotor which completely encases the stator. Both ends of this nonrotating hollow axle interlock with oscillation-absorbing rubber blocks so as to be torsion-resistant. Each rubber block is centered within one of the inlet openings by means of spoke elements. The rotor is supported on the hollow axle by means of two pivot bearings. The disadvantage of this well-known fan is that the dissipation of heat forming in the stator is problematic since the stator is surrounded all around by the rotor. Depending on the application, it is therefore necessary for safety reasons to use a larger motor, i.e., a more powerful motor. This entails not only higher expenditures but it also has a negative influence on the delivery volume of the medium to be transported since an increase in the size of the motor leads to a reduction of the flow cross section, which in turn necessitates an increase in the number of revolutions in order to obtain a predetermined delivery volume. Unfortunately, this results in a further noise increase.

The German Patent Specification No. 1,175,785 describes a suspension for an small electric motor which is generally used as a drive motor but which can also be used to drive two fan wheels located on both sides of the motor. The motor is again flexibly supported on a supporting frame by means of rubber elements. The motor has a stator flange which is directly connected to the first holding lug of the supporting frame by means of a rubber element. The rotor has an elongated shaft which extends in the direction facing away from the stator flange, which is supported in a pivot bearing, and which is connected to a second holding lug of the supporting frame by means of a rubber element. This well-known suspension, however, is unsuitable for use in a radial-blade double-inlet fan of the type described by this invention in which the motor is housed "within" the impeller and in which the radial impeller axially extends on both sides beyond the motor, which makes it impossible to fasten the stator flange as described in the case of the well-known motor.

In addition, radial-blade double-inlet fans are known in which the motor is attached only on one side, i.e., in a "flying" position, to a lateral wall of the casing by means of support arms (a so-called "fastening spider"). For this purpose, the support arms extend axially from the motor toward one of the inlet openings, with the radially extending ends of these support arms being screwed to the lateral wall of the casing in the area in which the lateral wall encloses the inlet opening. This type of suspension is suitable only for relatively lightweight motor/impeller units. Furthermore, this type of suspension is possible only if no flexible oscillation-absorbing support is used since otherwise the position of the motor and the impeller might shift as a result of a deformation of the support arms and/or the elastic oscillation-absorbing elements. As a result of such a shift of the motor or impeller, friction accompanied by unpleasant noise may result, or even worse, the impeller might not be able to rotate at all.

It is therefore the objective of this invention to create a radial-blade double-inlet fan of the type described in the introduction in which an adequate heat dissipation from the stator is ensured while the flexible suspension of the motor, which is also suitable for very heavy motor/impeller units, is retained.

This problem is solved according to this invention as follows: the stator is connected to a stator flange, the rotor encloses the stator only along one side approximately up to the stator flange, and the motor is supported by a shaft pivoted in a pivot bearing which is attached to the casing by means of a flexible oscillation-absorbing element, with this shaft rotating with the rotor and extending axially beyond the motor, on the one hand, and the stator flange is connected by means of a heat-conducting metal lamination directly to a flange-extending element which functions as a cooling element and which is located in the flow path of a medium to be transported, with this stator flange being attached to the casing in such a way that the attachment is both flexible and torsion-resistant, on the other hand.

Thus, to facilitate the dissipation of heat, the motor and its rotor according to this invention are designed to be open on one side. This makes it possible for the heat generated in the stator to be given off very effectively and to considerable advantage to the medium to be transported (especially air) via the stator flange which is connected to the stator lamination and via the flange-extending element according to this invention. The reason for this effective dissipation of heat is that the flange-extending element is positioned at least in part in the flow path of the medium, thus functioning as a cooling element. The effectiveness of the dissipation of heat and the concomitant cooling may be further increased by providing the surface of the flange-extending element with area-enlarging cooling ribs, especially in the form of cooling fins. As a result of the twofold flexible support of the motor, the suspension according to this invention is also suitable for heavy motor/impeller units. At the same time, it effectively absorbs the oscillations that are generated; this means that a propagation of the oscillations generated in the motor and/or impeller region to the casing is eliminated.

Further positive characteristics of various embodiments of this invention are described in the subordinated claims and in the following description.

This invention will be explained in greater detail on the basis of practical examples of a radial-blade fan according to this invention which are shown in the attached drawings.

FIG. 1 shows a partial axial section of a radial-blade fan according to this invention as a first practical example.

FIGS. 2 through 5 show highly simplified schematic axial sections of various other practical examples of a radial-blade fan according to this invention.

FIG. 6 shows a flexible oscillation-absorbing element functioning as a support for a pivot bearing for the shaft which rotates with the rotor in a sectional drawing corresponding to FIG. 1 (area VI in FIG. 1) and a sectional view along the line VI—VI in FIG. 7, and FIG. 7 shows a top view of the oscillation-absorbing element in the direction of arrow VII according to FIG. 6.

In all of the figures of the drawing, identical parts or components or those having the same function are invariably marked with the same reference numbers and are therefore described only once in the text below.

As FIG. 1 shows, a radial-blade double-inlet fan 1 according to this invention consists of casing 2 (only partially shown) with two parallel side walls 4,6 facing each other, each of which contains an inlet opening 8,10. Inlet openings 8,10 are arranged or designed so as to be aligned, especially congruent, in the vertical direction relative to lateral walls 4,6. Preferably, each of these openings is enclosed by a nozzle-like inflow rim 12 which faces toward the inside of casing 2. Approximately in the center between inlet openings 8,10, an external electrical rotor motor 14 consisting of an internal stator 16 and an external rotor 18 are located within casing 2. Since rotor 18 encloses stator 16, the drawing depicts only part of stator 1 6. On its outer peripheral area, rotor 18 carries a radial impeller 20. This motor-/impeller unit is designed to ensure that impeller 20 rotates around rotational axis 22 which runs through the center of the two inlet openings 8,10 when motor 14 is rotating. Radial impeller 20 which on both sides extends axially beyond motor 14 into the direction of inlet openings 8,10 has conventionally known blades 24 which are attached at a certain distance from each other to the circumference around the rotational axis and thus form the outer circumference of impeller 20. These blades enclose a cylindrical inflow area 26 which is aligned with inlet openings 8,10 in the direction of rotational axis 22. Impeller 20 is enclosed by spiral chamber 28 which is formed within casing 2 and which has a radial or tangential discharge opening (not shown). As a result of the substantially known design described so far, the rotation of impeller 20 causes a medium which is to be transported, especially air, to flow first in an axial direction through inlet openings 8,10 into casing 2 and into inflow area 26 of impeller 20. This medium is subsequently accelerated in a radial direction by blades 24 and pushed into spiral chamber 28, from which it is subsequently discharged through the discharge opening (not shown). This flow sequence is indicated by the broken-line arrows 30.

To absorb the oscillations, i.e., to prevent the transmission of oscillations generated in the vicinity of motor 14 and/or impeller 20 to casing 2, which may constitute a source of unpleasant noise, motor 14—and therefore also impeller 20—is flexibly supported by casing 2. To ensure at the same time that the stator is effectively cooled, i.e., that the heat generated within the stator is dissipated, this invention provides for stator 16 to be connected to a disk-shaped stator flange 32 which extends in a vertical direction relative to rotational axis 22. Preferably, a metal stator lamination plate is connected to stator flange 32 either directly or via a heat-conducting element; in any case, the stator lamination plate should be an effective thermal conductor. Rotor 18 is designed in the shape of a pot and encloses stator 16 only along the side facing away from stator flange 32, which means that stator flange 32 is axially located outside the area enclosed by rotor 18. To support motor 14, the following design is used: on the one hand, shaft 34 which rotates with rotor 18 and which extends axially beyond motor 14 pivots in a pivot bearing 38 which is attached to casing 2 by means of a flexible oscillation-absorbing element 36. On the other hand, according to this invention, stator flange 32 is directly connected to a metal-laminated, heat-conducting flange-extending element 40 which extends in an axial direction away from motor 14 and which attaches the stator flange to casing 2 ensuring that the connection is flexible and torsion-resistant with respect to rotational axis 22. According to this invention, flange-extending element 40 spans the axial distance between stator flange 32 and the support which is located in the area of inlet opening 10 or lateral wall 6 of the casing and which is connected to casing 2. As provided by this invention, flange-extending element 40 functions as a cooling element which is at least in part located in the flow path of the medium to be transported, thus ensuring that it is contacted by, i.e., exposed to the medium to be transported, as indicated in the drawing by the broken-line arrows 30. The heat generated in stator 16 is therefore transferred very effectively via stator flange 32 to flange-extending element 40 and from there to the medium.

In the practical example according to FIG. 1, flange-extending element 40 consists first of all of a large-surface contact segment 42 which rests, either directly or in combination with a special heat-exchanging layer (not shown), upon stator flange 32 so as to ensure excellent thermal conduction, and which is connected detachably, for example, by means of bolts 44, to the stator flange, and secondly, to a holding pin 46 which is attached so as to be torsion-resistant (with respect to torsion around rotational axis 22) to a flexible oscillation-absorbing element 48 which is supported by casing 2 and which is located in the central region of inlet opening 10. Preferably, oscillation-absorbing element 48 consists of a flexible rubber material and has recessed groove 49 which engages holding pin 46. Holding pin 46 and recessed groove 49 have matching noncircular cross sections, thus preventing relative torsional movements. Oscillation-absorbing element 48 is supported by and attached so as to be torsion-resistant to the casing by means of several, preferably three, spoke-like holding braces 50 which are attached radially and at a certain distance from each other along the circumference of the casing. In the area enclosing inlet opening 10, the outer ends of the spoke-like holding braces are screwed to lateral wall 6.

In addition, FIG. 1 illustrating a practical example of this invention shows that shaft 34 which pivots in pivot bearing 38 is located on the side of motor 14 that faces away from flange-extending element 40. Oscillation-absorbing element 36 which supports pivot bearing 38 is located in the central area of inlet opening 8 and, like the opposite oscillation-absorbing element 48, is supported by and attached to casing 2 by means of several, preferably three, spoke-like holding braces 50 which are are attached radially and at a certain distance from each other along the circumference of the casing. Again, it is recommended to prevent a relative torsional movement between oscillation-absorbing element 36 and holding braces 50 by any suitable means.

At this point, reference is made to FIGS. 6 and 7 which show an enlargement of the oscillation-absorbing element 36 shown in FIG. 1 which consists of a flexible rubber material. This enlargement shows that oscillation-absorbing element 36 has a plug-in unit 52 which can be plugged into an inner flange ring 54 which is connected with holding braces 50 (FIG. 1). Plug-in unit 52 has a noncircular external cross section which, as shown in FIG. 7, may preferably have a triangular shape. Flange ring 54 has a matching plug-in opening. Plug-in unit 52 is also fitted with stopping grippers 56 which mesh with flange ring 54 when the plug-in unit is plugged in. In addition, oscillation-absorbing element 36 has recess 58 which holds pivot bearing 38, as shown in FIG. 1, by providing a positively locked and/or frictional connection. When plugged into flange ring 54, oscillation-absorbing element 36 rests against flange ring 54 along a flange-like rim 60; thus, flange ring 54 is inserted between rim 60 and stopping grippers 56, providing a secure support for oscillation-absorbing element 36.

Certain details of the practical examples illustrated in FIGS. 2 through 5 correspond to the embodiment shown in FIG. 1. Therefore, only specific differences between the various practical examples will be discussed.

According to FIG. 2, flange-extending element 40 and stator flange 32 are designed in one piece; however, the flange-extending element also contains holding pin 46 which is supported by oscillation-absorbing element 48. A special advantage of this embodiment is that flange-extending element 40 has fin-like cooling ribs 62, so-called cooling fins, which enlarge its exothermic surface. In the practical example shown in FIG. 2, these cooling fins extend in an approximately axial direction through the angle formed by stator flange 32 and holding pin 46. In a further development, a second advantage is that rotor 18—in addition to shaft 34—is connected to a drive shaft 64 (indicated by the broken line) which, starting at rotor 18, extends axially through the axial openings of stator 16, stator flange 32, and through a channel-like opening of flange-extending element 40 to and beyond oscillation-absorbing element 48, and, with its free end, drives, for example, a second fan wheel (not shown) or a second motorless fan. In all other respects, this practical example corresponds to that shown in FIG. 1.

The practical example shown in FIG. 3 differs from that of FIGS. 1 and 2 in that flange-extending element 40 is different. In FIG. 3, flange-extending element 40 also has a large-surface contact segment 42 which is connected to stator flange 32 so as to provide excellent thermal conduction; however, in this case, the contact segment also has several, preferably three, holding arms 66 which are attached to it at a certain distance from each other along the circumference, extending in the direction of the inlet openings 10, and whose free terminal areas 68, which radiate outward, are individually connected through a flexible oscillation-absorbing element 70 to the region of casing 2 or its lateral wall 6 which encloses inlet opening 10. Holding arms 66 are located almost completely in the flow path of the transported medium, thus again ensuring a high cooling capacity.

With respect to flange-extending element 40, the practical example according to FIG. 4 corresponds to that shown in FIG. 3, with the following difference: shaft 34, which rotates with rotor 18, is not attached to the side facing away from stator flange 42 and is also not supported in the region of inlet opening 8. Instead, in this embodiment of the invention, shaft 34 is routed through the openings of stator 16, stator flange 32, and contact segment 42 of flange-extending element 40 and, like flange-extending element 40, is supported in the region of inlet opening 10, with this support principally corresponding to that described for the practical examples shown in FIGS. 1 through 3. In this particular embodiment, an additional drive shaft 64 (indicated by the broken line) may be connected to rotor 18 on the side facing away from shaft 34 and routed through inlet opening 8 out of casing 2.

With respect to the arrangement and support of shaft 34 which rotates with rotor 18, the practical example shown in FIG. 5 corresponds to that of FIGS. 1 through 3. In this embodiment, however, flange-extending element 40 is designed in the form of a spring element 72, preferably consisting of a helical spring made of spring steel. Thus, the flange-extending element 40 as such forms a flexible oscillation-absorbing element. One end of spring element 72 is connected to stator flange 32 by means of a metal lamination element, and is torsion-resistant and heat-conducting. The other end of spring element 72 is connected so as to be torsion-resistant to support segment 74 which is positioned in the central region of inlet opening 10 and attached to casing 2 by means of several, preferably three, spoke-like holding braces 50 which are arranged radially along the circumference of the casing. Both stator flange 32 and support segment 74 preferably are fitted with one holding pin 76 each for attaching spring element 72. In this highly recommended embodiment of the invention, flange-extending element 40 functions both as a cooling element and as an oscillation-absorbing element.

This invention is not restricted to the practical examples shown in the drawings and described in the text but also comprises any similarly functioning embodiments within the scope of this invention. In particular, any of the supporting mechanisms described may be combined in any form and by any suitable means.

We claim:

1. A radial-blade double-inlet fan comprising:
    a casing (12) with two inlet openings facing each other;
    an electrical motor having an external rotor centered in the casing between the inlet openings, the motor having a stator (16) and a rotor (18);
    a radial impeller which is connected to the rotor so as to rotate on an axis (22) coaxial with the inlet openings and thereby transport a medium in an axial direction through the inlet openings into the casing, the axis extending on both sides beyond the motor into the direction of the inlet openings;
    the stator (16) being connected to a stator flange (32), with the rotor (18) enclosing the stator (16) only on one side substantially up to the stator flange (32);

a shaft (34) rotatable with he rotor (18) and axially extending beyond the motor (14) to be pivoted in a pivot bearing (38) attached to the casing (2) by means of an elastic oscillation-absorbing element (36) so that the motor is elastically supported by the casing;

a flange-extending element (40) connected to the stator flange (32) in good heat-conductive relationship therewith and attached to the casing by flexible and torsion-resistant means (70) so that the motor has another elastic support by the casing; and the flange-extending element being located in the flow path of the medium transported by the radial impeller, so as to conduct heat from the stator flange into the flow path for dissipation into that medium, whereby the flange-extending element provides a cooling element for the transmission of heat produced in the stator.

2. Radial-blade fan according to claim 1, characterized by the fact that flange-extending element (40) has rib-like cooling fins (62) which enlarge its surface.

3. Radial-blade fan according to claim 1, characterized by the fact that the flange-extending element (40) is detachably connected to the stator flange (32).

4. Radial-blade fan according to claim 1, characterized by the fact that flange-extending element (40) is undetachably connected to stator flange (32).

5. Radial-blade fan according to claim 1, characterized by the fact that on the side of flange-extending element (40) which faces away from stator flange (32), an axial holding pin (46) is attached, with this holding pin being supported, so as to be torsion-resistant, in a flexible oscillation-absorbing element (48) which is located in the central region of one (10) of the inlet openings and which is supported by casing (2).

6. Radial-blade fan according to claim 5, characterized by the fact that oscillation-absorbing element (48) which holds holding pin (46) of flange-extending element (40) is supported by and attached so as to be torsion-resistant to casing (2) by means of several spoke-like holding braces (50) which are attached radially and at a certain distance from each other along the circumference of the casing.

7. Radial-blade fan according to claim 1, characterized by the fact that, starting at its contact section (42) which is connected to stator flange (32), flange-extending element (40) has several holding arms (66), which are attached to it at a certain distance from each other along the circumference, extending into the direction of one (10) of the inlet openings, and whose free terminal points (68) are individually connected via a flexible oscillation-absorbing element (70) to the area of casing (2) which encloses inlet opening (10).

8. Radial-blade fan according to claim 1, characterized by the fact that flange-extending element (40) is designed in the form of a spring element (72) which, with its end facing away from stator flange (32), is connected so as to be torsion-resistant to a support segment (74) which is positioned in the central region of inlet opening (10) and attached to casing (2) by means of several spoke-like holding braces (50) which are arranged radially along the circumference of the casing.

9. Radial-blade fan according to claim 1, characterized by the fact that the oscillation-absorbing element (36), which holds pivot bearing (38) for shaft (34) which rotates with rotor (18), is positioned in the central region of one of the inlet openings (8/10) and supported by and attached to casing (2) by means of several spoke-like holding braces (50) which are arranged radially along the circumference of the case and that this pivot bearing is torsion-resistant.

10. Radial-blade fan according to claim 1, characterized by the fact that pivot bearing (38) is held in a recess (58) of oscillation-absorbing element (36) so as to provide a connection with the oscillation-absorbing element.

11. Radial-blade fan according to claim 1, characterized by the fact that flange extending element (40) is supported by and attached to casing (2) in the region of one of the inlet openings (10) and that shaft (34) which rotates with rotor (18) is supported by and attached to the casing in the region of the other inlet opening (8).

12. Radial-blade fan according to claim 1, characterized by the fact that flange-extending element (40) and shaft (34) which rotates with rotor (18) are supported by and attached to the casing in the region of the same inlet opening (10).

13. Radial-blade fan according to claim 1, characterized by an additional drive shaft (64) for driving another fan, with this drive shaft being connected to rotor (18) and axially extending out of casing (2) into the direction facing away from shaft (34) which is supported by casing (2).

* * * * *

UNITED STATES PATENT AND TRADEMARK OFFICE
CERTIFICATE OF CORRECTION

PATENT NO. : 5,281,106
DATED : January 25, 1994
INVENTOR(S) : Wilhelm Reinhardt et al.

It is certified that error appears in the above-identified patent and that said Letters Patent is hereby corrected as shown below:

Column 7, line 1, change "he" to --the--.

Signed and Sealed this

Twenty-eighth Day of June, 1994

Attest:

BRUCE LEHMAN

Attesting Officer

Commissioner of Patents and Trademarks